United States Patent
Shaw et al.

(10) Patent No.: US 11,863,990 B2
(45) Date of Patent: Jan. 2, 2024

(54) CYBERSECURITY SYSTEM FOR EDGE PROTECTION OF A WIRELESS TELECOMMUNICATIONS NETWORK

(71) Applicant: T-Mobile USA, Inc., Bellevue, WA (US)

(72) Inventors: Venson Shaw, Kirkland, WA (US); Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/990,102

(22) Filed: Nov. 18, 2022

(65) Prior Publication Data

US 2023/0087670 A1   Mar. 23, 2023

Related U.S. Application Data

(63) Continuation of application No. 17/154,977, filed on Jan. 21, 2021, now Pat. No. 11,546,767.

(51) Int. Cl.
*H04W 12/67* (2021.01)
*H04W 12/122* (2021.01)
*H04W 12/30* (2021.01)

(52) U.S. Cl.
CPC ......... *H04W 12/122* (2021.01); *H04W 12/35* (2021.01); *H04W 12/67* (2021.01)

(58) Field of Classification Search
CPC .... H04W 12/122; H04W 12/35; H04W 12/57
See application file for complete search history.

(56) References Cited

U.S. PATENT DOCUMENTS

| | | |
|---|---|---|
| 7,841,008 B1 | 11/2010 | Cole et al. |
| 8,132,260 B1 | 3/2012 | Mayer et al. |
| 8,201,257 B1 | 6/2012 | Andres et al. |
| 8,495,745 B1 | 7/2013 | Schrecker et al. |
| 8,495,747 B1 | 7/2013 | Nakawatase et al. |
| 8,621,637 B2 | 12/2013 | Al-harbi et al. |
| 8,650,637 B2 | 2/2014 | Beresnevichiene et al. |
| 8,918,883 B1 | 12/2014 | Boyle et al. |
| 9,021,595 B2 | 4/2015 | Schrecker et al. |
| 9,602,529 B2 | 3/2017 | Jones et al. |
| 9,992,217 B2 | 6/2018 | Taylor et al. |
| 10,387,657 B2 | 8/2019 | Belfiore et al. |
| 10,972,508 B1 | 4/2021 | Dods |
| 11,304,115 B2 | 4/2022 | Berzin et al. |
| 11,431,746 B1 | 8/2022 | Shaw et al. |

(Continued)

FOREIGN PATENT DOCUMENTS

| | | |
|---|---|---|
| CN | 101374051 A | 2/2009 |
| CN | 101436967 A | 5/2009 |

(Continued)

*Primary Examiner* — Brian F Shaw
(74) *Attorney, Agent, or Firm* — Perkins Coie LLP

(57) ABSTRACT

A method performed by a system includes instantiating a vulnerability-risk-threat (VRT) service for a security edge protection proxy (SEPP) element of a 5G telecommunications network. The system intercepts and parameterizes network traffic of the SEPP element to identify network functions (NFs) or associated services that requires cybersecurity protection and selects security resources for protecting the identified NFs or associated services. The system prioritizes an NF or associated service that is most frequently used (MFU) or most recently used (MRU) and then allocates the security resources in accordance with the prioritization.

20 Claims, 9 Drawing Sheets

(56) References Cited

U.S. PATENT DOCUMENTS

| | | |
|---|---|---|
| 2008/0028470 A1 | 1/2008 | Remington et al. |
| 2009/0106843 A1 | 4/2009 | Kang et al. |
| 2012/0180133 A1 | 7/2012 | Al-Harbi et al. |
| 2012/0185945 A1 | 7/2012 | Andres et al. |
| 2013/0055394 A1 | 2/2013 | Beresnevichiene et al. |
| 2013/0340084 A1 | 12/2013 | Schrecker et al. |
| 2014/0157405 A1 | 6/2014 | Joll et al. |
| 2016/0112375 A1 | 4/2016 | Cohen et al. |
| 2018/0115563 A1 | 4/2018 | Lueken et al. |
| 2018/0124090 A1 | 5/2018 | Koren et al. |
| 2018/0137288 A1 | 5/2018 | Polyakov |
| 2018/0146004 A1 | 5/2018 | Belfiore et al. |
| 2019/0052665 A1 | 2/2019 | Mahieu et al. |
| 2019/0123975 A1 | 4/2019 | Telles et al. |
| 2019/0372939 A1 | 12/2019 | Kalliola et al. |
| 2019/0380037 A1 | 12/2019 | Lifshitz et al. |
| 2020/0042716 A1 | 2/2020 | Belfiore et al. |
| 2020/0210589 A1 | 7/2020 | Sood et al. |
| 2020/0313996 A1 | 10/2020 | Krishan et al. |
| 2020/0314672 A1 | 10/2020 | Farooq |
| 2021/0258872 A1 | 8/2021 | Mihály et al. |
| 2021/0306235 A1 | 9/2021 | Al-Dulaimi et al. |
| 2021/0377212 A1 | 12/2021 | Holtmanns et al. |
| 2022/0007192 A1 | 1/2022 | Shaw |
| 2022/0021538 A1 | 1/2022 | Madisetti et al. |
| 2022/0052992 A1 | 2/2022 | Zhang et al. |
| 2022/0060491 A1 | 2/2022 | Achleitner et al. |
| 2022/0103588 A1 | 3/2022 | Shaw |
| 2022/0103596 A1 | 3/2022 | Shaw |
| 2022/0117040 A1 | 4/2022 | Pocha et al. |

FOREIGN PATENT DOCUMENTS

| | | |
|---|---|---|
| CN | 103716177 A | 4/2014 |
| CN | 104965972 A | 10/2015 |
| CN | 107819771 A | 3/2018 |
| CN | 109167786 A | 1/2019 |
| CN | 105871882 B | 2/2019 |
| CN | 105763562 B | 4/2019 |
| DE | 102016219457 A1 | 4/2018 |
| DE | 112017006109 T5 | 8/2019 |
| EP | 2284775 A2 | 2/2011 |
| JP | 2014503099 A | 2/2014 |
| JP | 5955863 B2 | 7/2016 |
| KR | 20090039524 A | 4/2009 |
| KR | 100955281 B1 | 4/2010 |
| KR | 101292640 B1 | 8/2013 |
| KR | 101310487 B1 | 9/2013 |
| KR | 20160141457 A | 12/2016 |
| KR | 20180068268 A | 6/2018 |
| KR | 20180121459 A | 11/2018 |
| WO | 2008004498 A1 | 1/2008 |
| WO | 2012096916 A1 | 7/2012 |
| WO | 2015025694 A1 | 2/2015 |
| WO | 2015070466 A1 | 5/2015 |
| WO | 2017137778 A1 | 8/2017 |
| WO | 2018049437 A2 | 3/2018 |
| WO | 2018098294 A1 | 5/2018 |
| WO | 2020060503 A1 | 3/2020 |

CYBERSECURITY SYSTEM FOR EDGE PROTECTION OF A WIRELESS TELECOMMUNICATIONS NETWORK

CROSS-REFERENCE TO RELATED APPLICATIONS

This application is a continuation of U.S. patent application Ser. No. 17/154,977, filed on Jan. 21, 2021, entitled CYBERSECURITY SYSTEM FOR EDGE PROTECTION OF A WIRELESS TELECOMMUNICATIONS NETWORK, which is hereby incorporated by reference in its entirety.

BACKGROUND

In telecommunications, 5G is the fifth-generation technology standard for cellular networks, the successor to 4G networks, which provide connectivity to most current mobile phones. Like its predecessors, the service area of 5G networks is divided into geographical areas called cells. The wireless devices in a cell are connected to internet and telephone networks by radio waves through a local antenna in the cell. A main advantage of 5G networks is greater bandwidth, yielding higher download speeds, eventually up to 10 gigabits per second (Gbit/s). Due to the increased bandwidth, 5G networks can also serve as general internet service providers (ISPs) and will make possible new applications in internet-of-things (IoT) and machine-to-machine (M2M) areas.

5G introduces a new era of cybersecurity threats because, among other things, it enables communications and access of vastly higher volumes and types of data relative to prior generation technologies, and thus broadens the possibility of cyberattacks. For example, the risk of data breaches or leaks of personal data can increase because user credentials that are readily communicated on networks can be stolen and used to gain access to private information available through applications and services. Thus, victims can readily have their personal or private information like social security numbers, addresses, date of births, driver license numbers, and other personal data compromised.

Although most interconnected devices on networks are safe, dependable, and reliable, 5G wireless networks create a greater number of vulnerabilities to, for example, malware compared to other communication networks. Malware refers to any software that is intentionally designed to cause damage to a computer, server, client, or network. A wide variety of malware types exist, including viruses, worms, Trojan horses, ransomware, spyware, adware, rogue software, and scareware. These vulnerabilities and others cannot be addressed with conventional techniques because deployment of security resources across a massively diverse network of elements and services is cost-prohibitive, resource intensive, and impractical. Thus, effective safeguards for 5G networks are desirable.

BRIEF DESCRIPTION OF THE DRAWINGS

Embodiments of the present technology will be described and explained through the use of the accompanying drawings.

Figure 1:
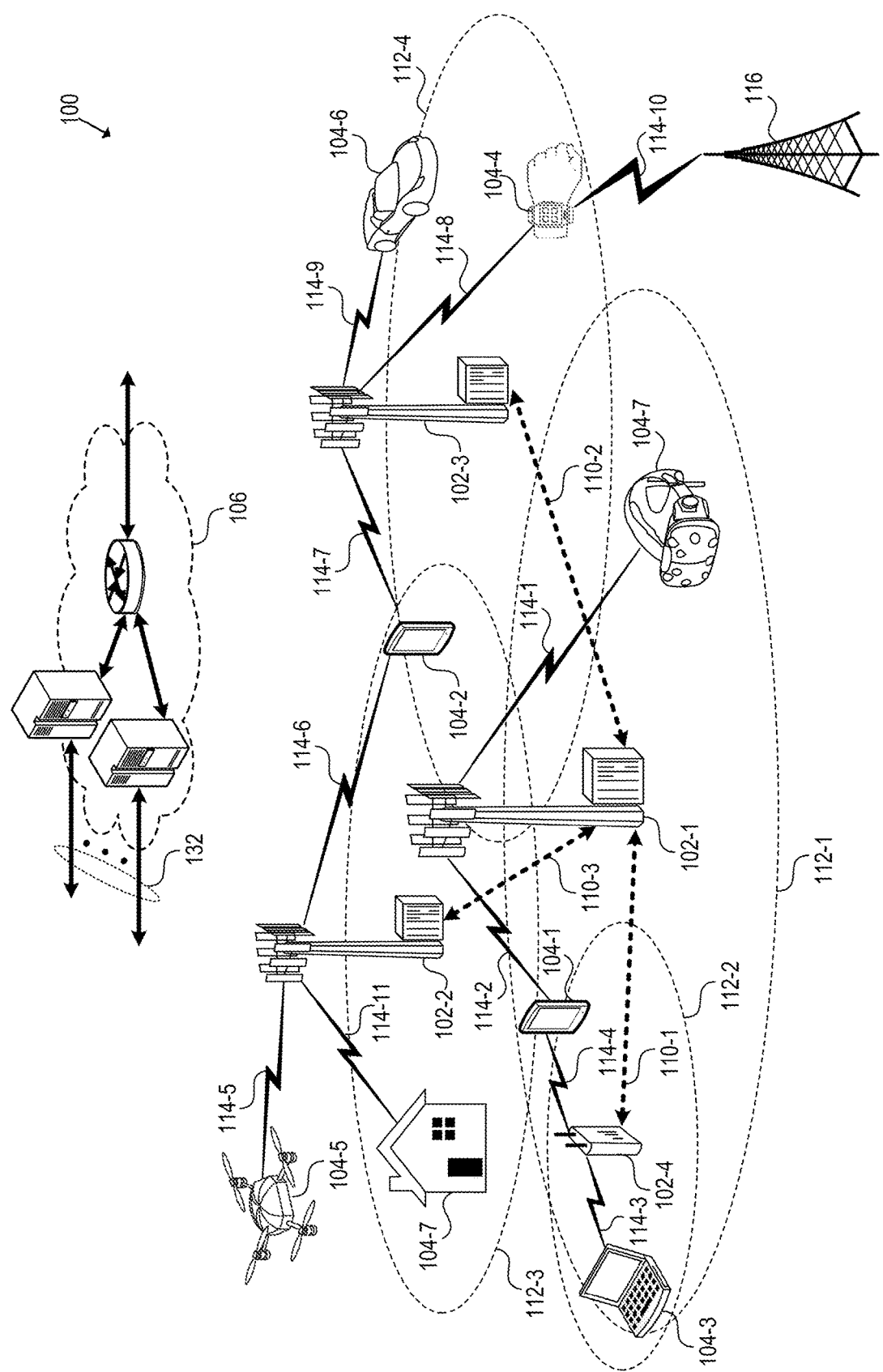
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technologies relate to security systems for a Service-Based Architecture (SBA) for wireless telecommunications networks (e.g., 5G networks). An SBA is a service-oriented architecture that has a modular framework. 3GPP standards define an SBA where control plane functionality and common data repositories of a network are delivered by way of interconnected Network Functions (NFs), with authorization to access each other's services. The NFs use a common interface to communicate rather than using dedicated interfaces. The common interface is akin to a crossbar switch that interconnects all the NFs. Although this provides flexibility, it creates cybersecurity risks because, for example, a hacked NF can access any other NF.

An aspect of the disclosed technologies includes a cybersecurity system for the common interface of the SBA. The system protects NFs and/or associated services from cyberattacks by monitoring the common interface that interconnects the NFs. The system intercepts network traffic and, based on the network traffic, identifies a NF or associated service that requires cybersecurity protection. The system then selects security resources to protect identified NFs or services. In one example, the system prioritizes security resources for NFs or services that are most frequently used (MFU) and/or most recently used (MRU). Once allocated, the security resources can dynamically redirect high risk data for external collection, management, and sanitization components of the network.

In one example, the system instantiates a vulnerability-risk threat (VRT) service that converts network traffic into VRT traffic, which reveals known security vulnerabilities and capabilities used to mitigate the risk of cyberattacks. A security model is used to parameterize the network traffic and detect malicious network traffic. The VRT parameters include a vulnerability parameter relating to a state or condition of a network element susceptible to a cyberattack; a risk parameter relating to a scope or potential harm of a cyberattack; and a threat parameter relating to a probability or source of a cyberattack. The system performs actions (e.g., block, quarantine, or redirect network traffic) to mitigate the risk of a cyberattack based on the output of the security model.

Another aspect of the disclosed technologies relates to a cybersecurity system for improving Security Edge Protection Proxy (SEPP) elements at the edge of the network. A SEPP is a security proxy in 5G that provides interconnect security between different operator networks. All signaling traffic across operator networks can transit through the SEPPs. In one implementation, a cybersecurity system or component thereof is coupled to a SEPP, which enables VRT awareness at the edge of the network. The cybersecurity system standardizes signaling traffic at the SEPP to reveal known vulnerabilities and capabilities used to mitigate the risk of cyberattacks. In one example, components of the cybersecurity system are distributed at SEPPs to orchestrate VRT traffic for a global model used to secure the network from traffic of external networks.

Another aspect of the disclosed technologies relates to securing network slices by defining security requirements and allocating network resources based on the security requirements. The security requirements can also be based on VRT traffic to reveal known vulnerabilities and capabilities used to mitigate the risk of cyberattacks. Network slicing is a capability of 5G infrastructures that enables multiplexing of virtualized and independent logical networks on the same physical network infrastructure. Network slicing brings a high degree of deployment flexibility and efficient resource utilization when deploying diverse network services and applications. Each network slice is a logical end-to-end (E2E) network tailored to fulfil diverse requirements requested by an application. Each network slice has predetermined capabilities, traffic characteristics, and service level agreements (SLA) and includes virtualized resources required to service the needs of an operator or subscribers. Thus, the disclosed technologies provide improved security on a per network slice basis.

The technologies thus create safeguards for service-oriented architectures from cyberattacks by addressing the effects of malicious activity. Additional techniques are described in the assignee's related applications including U.S. patent application Ser. No. 17/154,985, filed Jan. 21, 2021, titled "Cybersecurity System for Common Interface of Service-Based Architecture of a Wireless Telecommunications Network," U.S. patent application Ser. No. 17/154,998, filed Jan. 21, 2021, titled "Cybersecurity System for Network Slices of Wireless Telecommunications Network," U.S. patent application Ser. No. 17/138,674, filed Dec. 30, 2020, titled "Cybersecurity System for Outbound Roaming in a Wireless Telecommunications Network," U.S. patent application Ser. No. 16/874,649, filed May 14, 2020, titled "5G Cybersecurity Protection System Using Personalized Signatures," U.S. patent application Ser. No. 17/021,870, filed Sep. 15, 2020, titled "Visual Voicemail Centralized Authentication System for Wireless Networks," U.S. patent application Ser. No. 16/945,592, filed Jul. 31, 2020, titled "Cached Entity Profiles at Network Access Nodes to Re-Authenticate Network Entities," U.S. patent application Ser. No. 16/945,637, filed Jul. 31, 2020, titled "Connectivity Scheduler for NB-10T Devices," U.S. patent application Ser. No. 17/007,782, filed Aug. 31, 2020, titled "Wireless Network That Discovers Hotspots for Cyberattacks Based on Social Media Data," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-8 (referred to individually as "wireless device 104" or collectively as "wireless devices 104") and a core network 106. The wireless devices 104-1 through 104-8 can correspond to or include network entities that are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Service-Based Architecture

Service-Based Architectures (SBAs) provide a modular framework from which common applications can be deployed using components of varying sources and suppliers. The 3GPP standard defines an SBA, where control plane functionality and common data repositories of a 5G network are delivered by way of a set of interconnected Network Functions (NFs), each with authorization to access each other's services.

The SBA separates NFs into distinct units, or services, which are accessible over a 5G network in order to allow users to combine and reuse them in applications. The NFs can communicate with each other by passing data in a shared format or by coordinating an activity between two or more NFs. A service of an NF can be provided to others through a communication protocol over the 5G network. A principle that SBA shares with modular programming includes different services that can be used in conjunction to provide the functionality of a large application. SBA integrates distributed, separately maintained and deployed components. It is enabled by technologies and standards that facilitate components' communication and cooperation over a network. In one example, an SBA is related to an application programming interface (API), which can be thought of as the service, and the SBA as the architecture that allows the service to operate.

Figure 2:
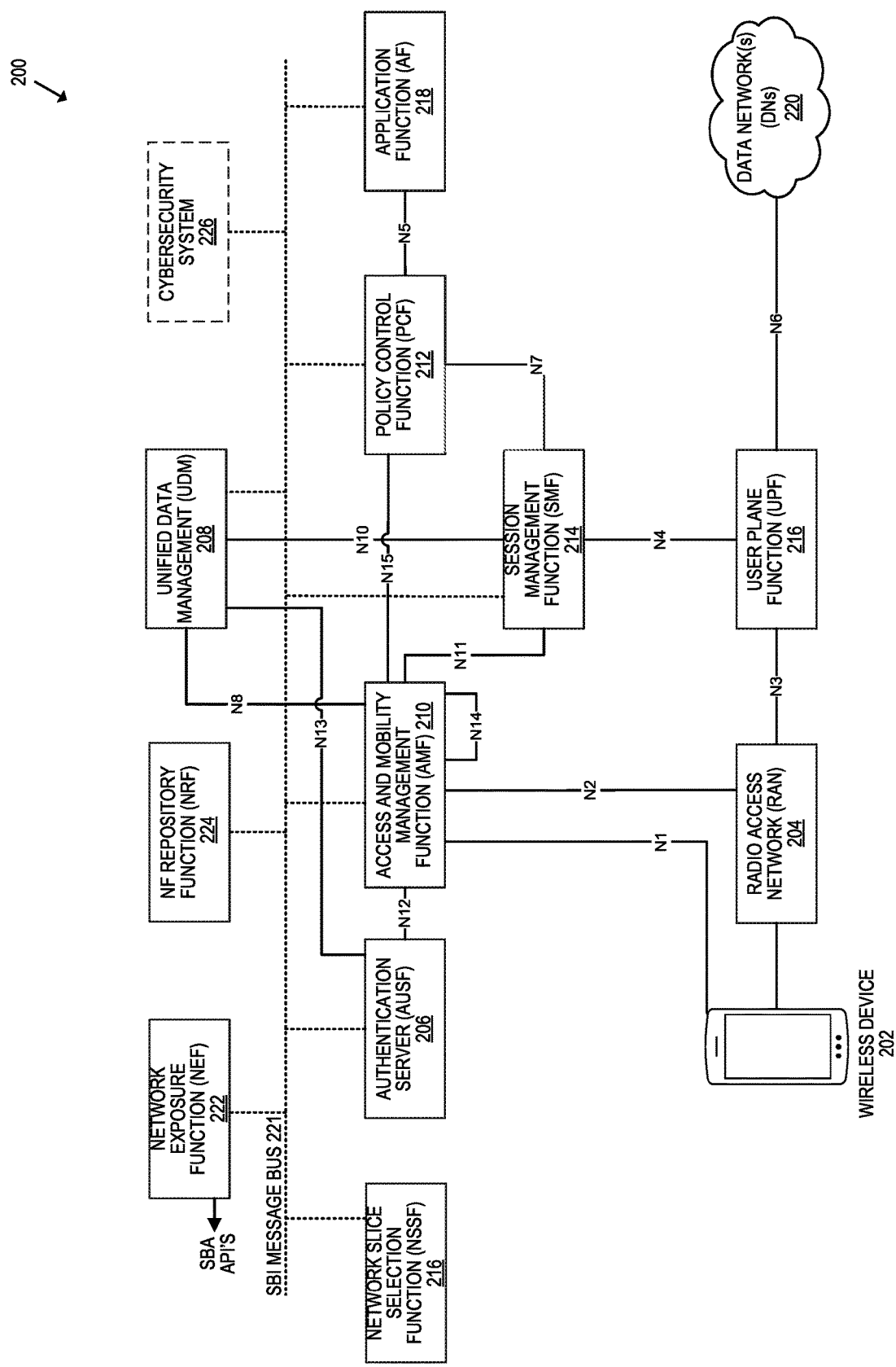
FIG. 2 is a block diagram that illustrates a 5G network architecture including a Service-Based Architecture (SBA).

FIG. 2 is a block diagram that illustrates a 5G network architecture 200 including an SBA. A wireless device 202 can access the 5G network via a RAN 204, through a NAN (e.g., a gNB). The architecture 200 includes NFs, which are self-contained, independent, and reusable. The NFs include an authentication server function (AUSF) 206, a unified data management (UDM) 208, an access and mobility management function (AMF) 210, a policy control function (PCF) 212, a session management function (SMF) 214, and a user plane function (UPF) 216. The PCF 212 can connect with one or more application functions (AFs) 218. The UPF 216 can connect with one or more data networks (DNs) 220. The interfaces N1 through N15 define the communications and/or protocols between each NF, as described in relevant standards. The UPF 216 is part of the user plane and the AMF 210, SMF 214, PCF 212, AUSF 206, and UDM 208 are part of the control plane. The UPFs can be deployed separately from control plane functions and the NFs of the control plane are modularized such that they can be scaled independently. Each NF service exposes its functionality through a Service Based Interface (SBI) 221, which employs a REST interface using HTTP/2. The SBA additionally includes a Network Exposure Function (NEF) 222, a NF Repository Function (NRF) 224 a Network Slice Selection Function (NSSF) 216, and a Service Communication Proxy (SCP) (not shown).

The SBA can provide a complete service mesh with service discovery, load balancing, encryption, authentication and authorization for interservice communication. The SBA employs a centralized discovery framework that leverages the NRF 222, which maintains a record of available NF instances and their supported services. The NRF 222 allows other NF instances to subscribe and be notified of registrations from NF instances of a given type. The NRF 222 supports service discovery, by receipt of discovery requests from NF instances and details which NF instances support specific services.

The NSSF 216 enables network slicing, which is a capability of 5G infrastructures, bringing a high degree of deployment flexibility and efficient resource utilization when deploying diverse network services and applications. A logical end-to-end (E2E) network slice has pre-determined capabilities, traffic characteristics and service level agreements and includes the virtualized resources required to service the needs of a Mobile Virtual Network Operator (MVNO) or group of subscribers, including a dedicated UPF, SMF, and PCF.

The AMF 210 serving a wireless device (e.g., wireless device 202) is common to all network slices that the wireless device is a member of. Identification of a network slice is via the Single Network Slice Selection Assistance Information (S-NSSAI). The network slice selection is triggered by a first AMF that receives a wireless device registration request, which the retrieves the permitted slices from the UDM (e.g., UDM 208) and then requests an appropriate network slice of the NSSF.

The UDM 208 provides services to other SBA functions, such as the AMF 210, SMF 214, and NEF. A UDM introduces the concept of user data convergence (UDC) that separates the user data repository (UDR) for storing and managing subscriber information that processes the subscriber information. The UDM 208 can employ UDC under 3GPP TS 22.101, which supports a layered architecture that separates user data from application logic in 3GPP systems. The UDM 208 is associated with a database (not shown) that can contain profile data for subscribers and/or other data that can be used to authenticate network entities. Given the large number of wireless devices (e.g., IoT devices) that can connect to the 5G network, the UDM 208 contains voluminous amounts of data that is accessed to authenticate network entities.

The UDM 208 is recognized as a stateful message store, holding information in local memory. The UDM 208, however, may also be stateless, storing information externally within a Unified Data Repository (UDR). The UDM 208 is analogous to the Home Subscriber Server (HSS), providing authentication credentials while being employed by the AMF 210 and SMF 214 to retrieve subscriber data and context.

The PCF 212 supports a unified policy framework, within the 5G infrastructure, for governing network behavior. The PCF 212 accesses the subscription information, required to make policy decisions, from the UDM 208 and then provides the appropriate policy rules to the control plane functions so that they can enforce them.

The SCP provides a highly distributed multi-access edge compute cloud environment and a single point of entry for a cluster of network functions, once they have been successfully discovered by the NRF 224. This allows the SCP to become the delegated discovery point in a data center, offloading the NRF 224 from distributed service meshes that ultimately make-up a network operator's infrastructure. Together with the NRF 224, the SCP forms the hierarchical 5G service mesh.

As shown, a cybersecurity system 226 is coupled to a common interface (e.g., the SBI 221) that interconnects the NFs. As indicated earlier, in 5G the SBA uses HTTP/2 signaling over the common interface rather than using dedicated interfaces between NFs. Although the common interface provides flexibility, it creates cybersecurity risks because, for example, a hacked NF can access any other NF. Accordingly, the cybersecurity system 226 can monitor the network traffic of the various NFs by monitoring the network traffic on the common interface rather than connecting to each interface between the NFs.

Cybersecurity System for Common Interface of Service Based Architecture

Figure 3:
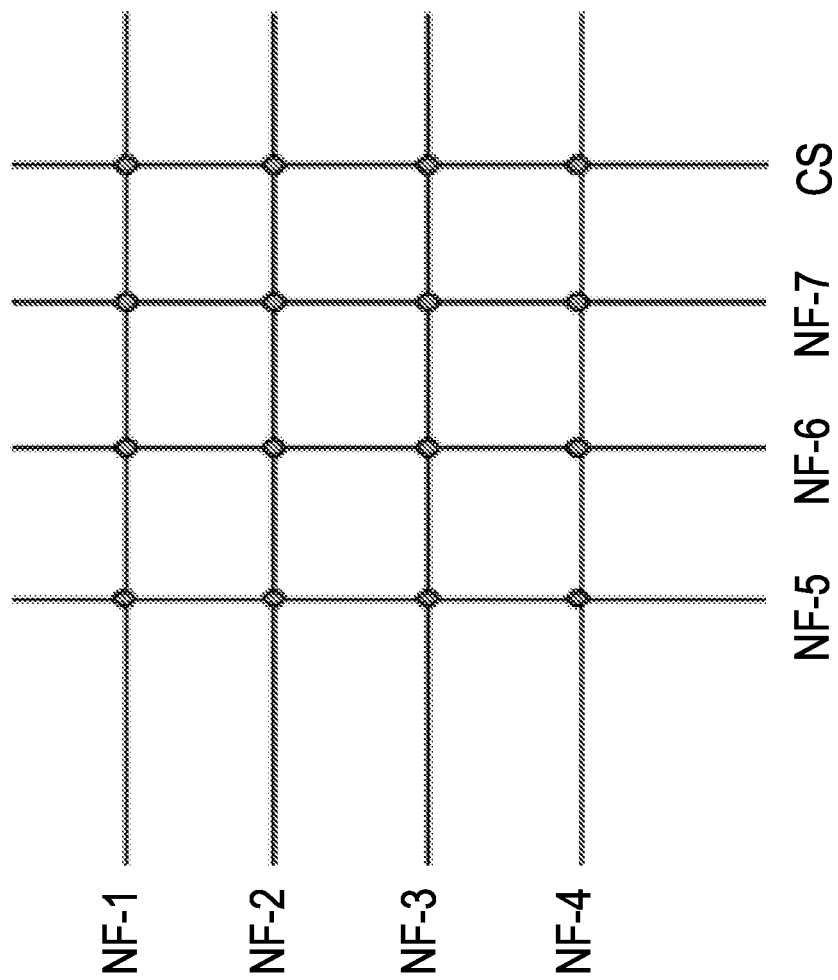
FIG. 3 illustrates an abstraction of a crossbar interconnect that represents the common interface that interconnects network functions (NFs).

The common interface of the SBA is analogous to a crossbar switch that interconnects all the NFs and a cybersecurity system (CS). FIG. 3 illustrates an abstraction of a crossbar interconnect that represents the common interface. As shown, the NF-1 through NF-8 and the CS are communicatively interconnected through a common protocol interface with a matrix configuration that is represented as a crossbar interconnect. The crossbar can have nodes or functional switches (not shown) to selectively communicate between some NFs and not others. The interconnect has multiple input and output lines that form a crossed pattern of interconnecting lines between which a connection may be established by closing a "switch" located at each intersection. Although the interconnect provides flexibility for communicating between multiple NFs by using a common protocol, it creates cybersecurity risks because, for example, one hacked NF can access or communicate with any other NF.

By coupling to the common interface, the cybersecurity system can monitor and dynamically protect the NFs and associated services from cyberattacks. The system can intercept network traffic in real-time or near real-time. Based on the network traffic, the system identifies a NF or service that requires cybersecurity protection and selects security resources available to protect the NF or service. The system can prioritize the security resources for NFs or services that are MFU and/or MRU. Once allocated, the security resources can dynamically redirect high risk data for external collection, management, and sanitization components of the network.

In one example, the system implements a vulnerability-risk threat (VRT) service that transforms network traffic into VRT traffic, which reveals known security vulnerabilities and capabilities to mitigate the risk of cyberattacks. The VRT service can include a security model to characterize and identify network traffic according to VRT parameters: a vulnerability parameter relating to a state or condition of a network element susceptible to a cyberattack; a risk parameter relating to a scope or potential harm of a cyberattack; and a threat parameter relating to a probability or source of a cyberattack. A cybersecurity system can process VRT traffic and perform actions (e.g., block, quarantine, or redirect network traffic) to mitigate the risk of a cyberattack.

Figure 4:
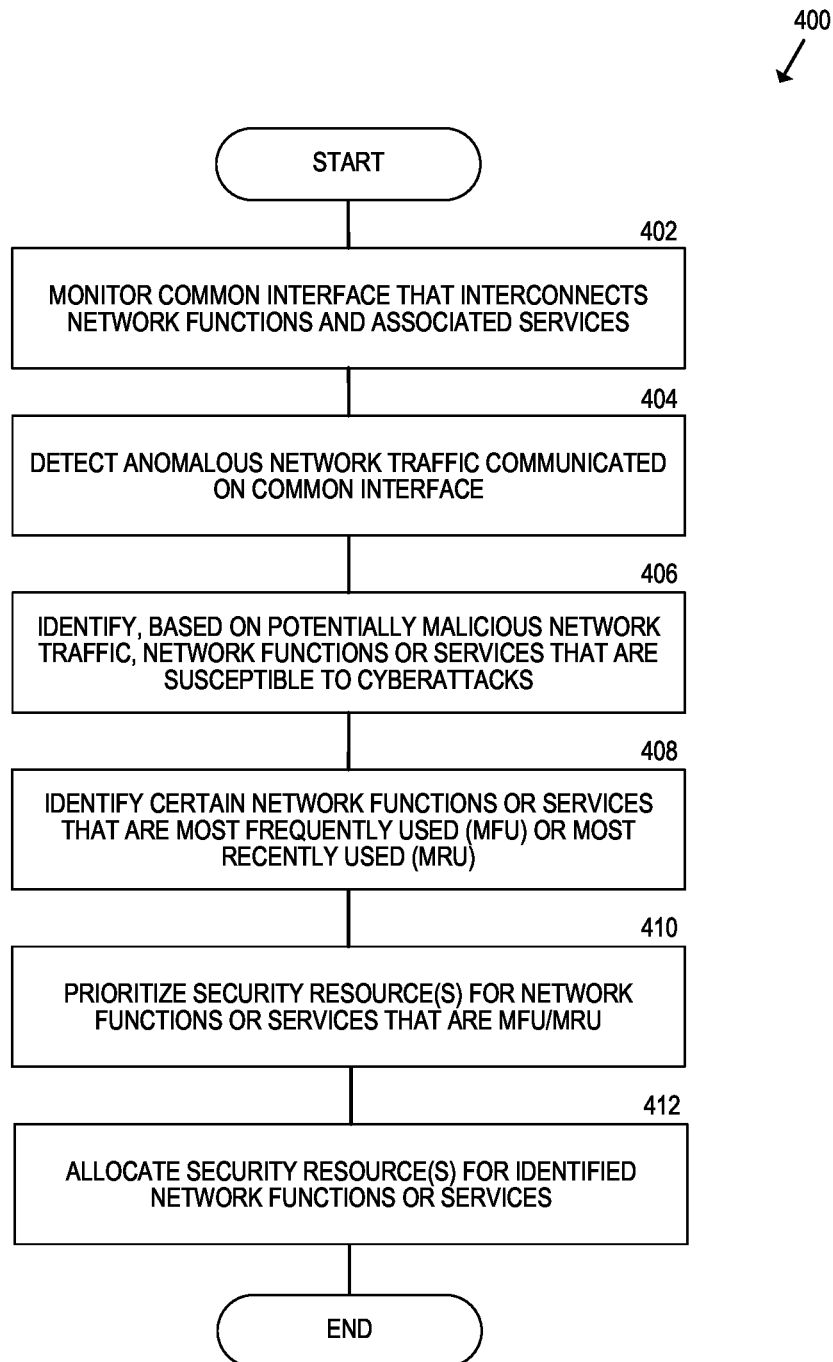
FIG. 4 is a flowchart that illustrates a method performed by a cybersecurity system to mitigate cyberattacks due to the common interface of an SBA.

FIG. 4 is a flowchart that illustrates a method performed by the cybersecurity system ("system") to mitigate cyberattacks due to the common interface of an SBA. An example of the common interface is an SBI that employs a REST interface using HTTP/2. The NFs of the SBA and the system are communicatively interconnected over the common interface. Any NF can communicate with any other NF over the common interface, and the system can monitor those communications. Specifically, the system can monitor for malicious network traffic to/from NFs and associated services that communicate over the common interface. Examples of the NFs include an AUSF, UDM, AMF, PCF, SMF, UPF, NEF, NRF, NSSF, and SCP.

At 402, the system instantiates a security service configured to monitor the interconnected NFs and/or associated services. For example, the security service can monitor HTTP/2 traffic communicated by the interconnected NFs over the HTTP/2 interface. As such, the system can protect the SBA against cyberattacks by simultaneously monitoring multiple NFs or associated services by using the common interface.

At 404, the system detects anomalous network traffic communicated over the common interface in real-time or near real-time. For example, the source of potentially malicious network traffic can include a first NF and a destination of that traffic can include a second NF that is authorized to access a service of the first NF. The communicated traffic can include HTTP/2 data of the service that is communicated over the HTTP/2 interface.

In one example, the system intercepts network traffic and transform that traffic to a VRT traffic that is processed by a VRT model to determine whether network traffic is normal traffic, anomalous traffic (e.g., potentially malicious), or known malicious traffic. For example, the system can characterize intercepted HTTP/2 traffic in relation to a vulnerability parameter that relates to a susceptibility of an NF or associated service to a cyberattack, a risk parameter that relates to a scope of a cyberattack, and a threat parameter that relates to a source of the cyberattack. The system can then identify the HTTP/2 traffic as normal, anomalous, or malicious network traffic based on the parameterized HTTP/2 traffic.

In one example, the system performs deep packet inspection (DPI) to analyze headers or payloads of packets to determine characteristics of the network traffic. For example, one NF can communicate packets having headers and payloads. The one or more of the packets are intercepted and/or copied by the security service, which performs DPI to determine anomalous packets. For example, the payload of a packet can be analyzed using regular expressions to determine patterns within the data of the payload. Regular expression methods include string matching, character sets and wildcards, character repetition, character sets and wild card repetitions, and constraints based on counting. If the data of the payload has a type of pattern indicative of malicious data and this is determined, then the security system can respond accordingly to mitigate the risk of cyberattacks as described herein.

At 406, the system identifies NFs or associated services that are susceptible to cyberattacks based on the network traffic. As such, the system can select one or more security resources for securing those NFs or associated services, and provision those security resource for the identified NF or associated services. That is, the system can detect potentially malicious network traffic communicated over the common interface based on an inspection of the network traffic communicated over the common interface and traces the network traffic to the source and/or destination of the NFs.

In another example, the system does not need to identify the source or destination of malicious network traffic. Instead, because the NFs share a common interface, the system merely needs to identify the existence of malicious network traffic and respond accordingly by filtering, blocking, and/or quarantining associated traffic.

At 408, the system can identify one or more NFs or associated services that are MFU and/or MRU. As such, security resources can be allocated to recently or frequently used NFs or associated services that readily expose functionality through the common interface. By identifying MFU/MRU network elements, the system can target security resources for those elements that are critical or current to operations of the SBA.

At 410, the system prioritizes allocation of the security resource(s) for the NFs or associated services that are MFU/MRU. In some instances, the network has constraints on the number or availability of security resources to mitigate cyberattacks. As such, prioritizing security resources for MFU/MRU elements provides a mechanism for effectively deploying the security resources for elements that are more important or indispensable to the operations of the network.

At 412, the system allocates the security resources for the identified NFs or associated services. Examples of the security resources include software and associated hardware configured to monitor and identify malicious network traffic and dynamically redirect the malicious network traffic to collection, management, and/or sanitization components of the telecommunications network. In another example, the security resources block potentially malicious network traffic communicated to/from NFs coupled to the common interface.

Cybersecurity System for Network Edge Protection

A cybersecurity system or component thereof is coupled to security edge protection proxy (SEPP) elements, which enables VRT awareness at the edge of the network. A SEPP is a security proxy in 5G that provides interconnect security between different operator networks. All signaling traffic across operator networks can transit through the SEPPs. The cybersecurity system standardizes signaling traffic at the SEPP to reveal vulnerabilities and capabilities used to mitigate the risk of cyberattacks. In one example, components of the cybersecurity system are distributed at SEPPs to orchestrate VRT traffic for a global model used to secure the network from traffic of external networks.

Figure 5:
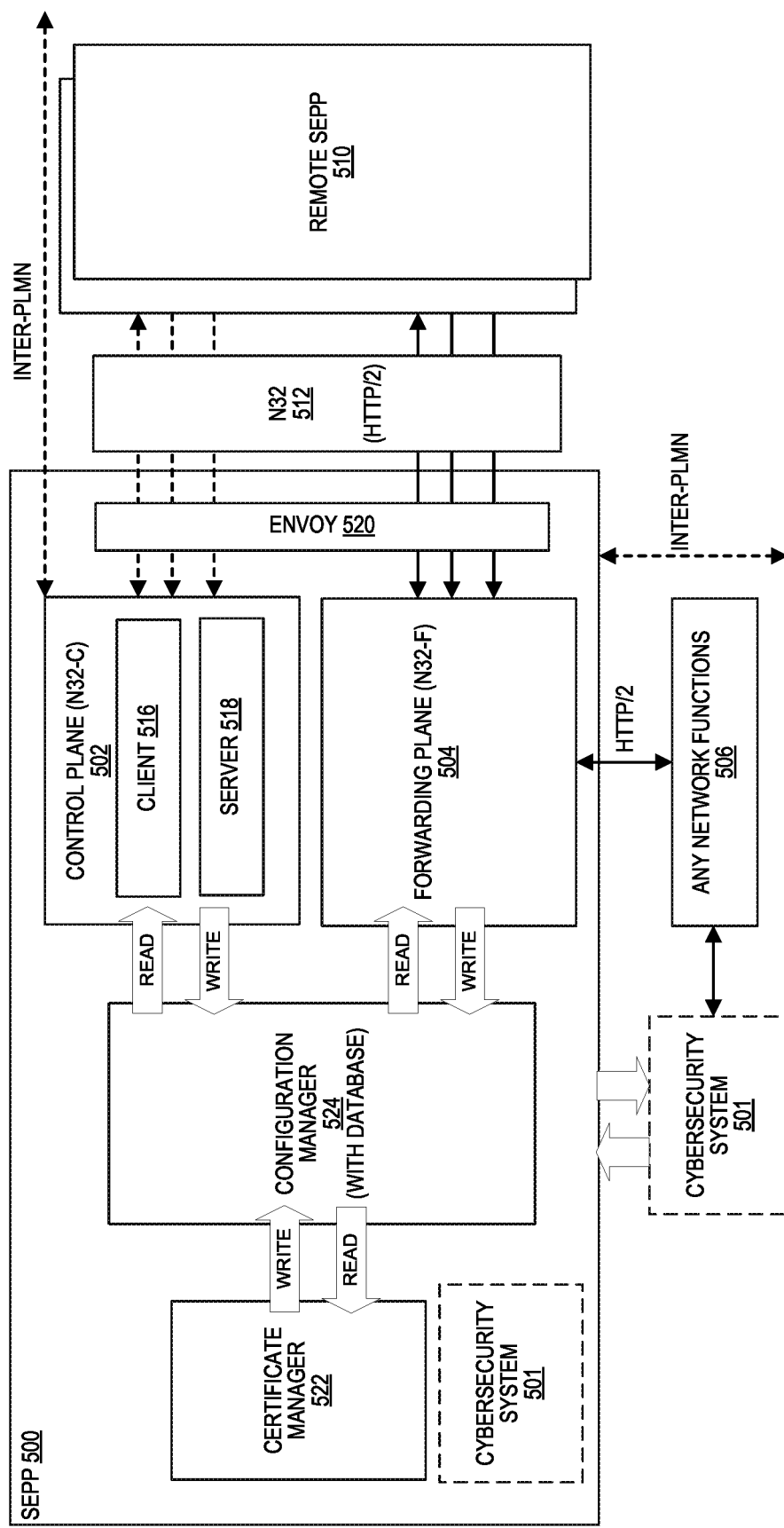
FIG. 5 is a block diagram that illustrates an architecture of a Security Edge Protection Proxy (SEPP) and cybersecurity system of a telecommunications network.

FIG. 5 is a block diagram that illustrates an architecture of a SEPP 500 coupled to a cybersecurity system 501 of a network. The SEPP 500 is part of a decentralized solution and includes a control plane 502 (N32-C) and a forwarding plane 504 (N32-F). The SEPP 500 is deployed between NFs 506 that belong to different Public Land Mobile Networks (PLMNs) that use the N32 interface to communicate with each other. The SEPP 500 communicates with remote SEPPs 510 over an N32 interface 512. The control plane 502 is used to negotiate a security capability between the SEPPs 508 and 510. The forwarding plane 504 is a data plane, which performs encryption/decryption of messages to/from another PLMN's SEPP based on the negotiated capability. The control plane client 514 and server 516 functionalities run separately.

An envoy 520 is used as a proxy to facilitate both control plane and forwarding plane messaging. Specifically, the envoy 520 operates as a point of origination as well as termination for all external messages (e.g., exchanged with a remote SEPP 510). A certificate manager 522 is responsible for storing certificates, as well as handling a certificate lifecycle. A configuration manager 524 is responsible for handling configuration related tasks (e.g., add, modify, delete tasks). The SEPP 500 can save configuration data in a local database, retrieve a runtime status of SEPP connections, and provide the information when requested.

In a control flow, the SEPPs 500 and 510 are mutually authenticated and negotiate a security mechanism. The SEPPs 500 and 510 use the control plane 502 to negotiate security configuration parameters to process data messages exchanged with each other. There security mechanism is agreed upon before conveying NF-related signaling. When a SEPP detects the lack of an agreed security mechanism with a peer SEPP or detects that security capabilities of the SEPP have been updated, the SEPP performs security capability negotiations with the peer SEPP in order to determine which security mechanism to use for secure signaling.

In a data flow, the SEPP 500 receives HTTP/2 request/response messages from the NFs 506. The SEPP 500 encrypts outbound messages based on agreed security capability parameters before being sent on the forwarding plane 504 to the SEPP 510. The SEPP 500 also decrypts inbound messages from the SEPP 510 before sending it to the NF 506 in the PLMN.

The cybersecurity system 501 is communicatively coupled to or embedded in the SEPP 500 to enable VRT awareness. As such, network traffic is parameterized and processed as VRT traffic with a VRT model to protect against cyberattacks. The resulting VRT traffic reveals known security vulnerabilities and capabilities that can be shared among SEPPs to mitigate the risk of a cyberattack against the network. In one example, the cybersecurity system 501 has components that are distributed across SEPPs to uniformly parameterize network traffic into VRT traffic that is used to secure the network from its edge. The cybersecurity system 501 analyzes the VRT traffic to identify SEPPs and related network elements (e.g., NFs and/or services) that require cybersecurity protection. The cybersecurity system 501 can prioritize security resources for certain SEPPs ore related network elements that are MFU and/or MRU. Thus, the cybersecurity system 501 can dynamically allocate and manage security resources and, for example, redirect high-risk traffic to external collection, management, and/or sanitization components to safeguard the network from its edge.

Figure 6:
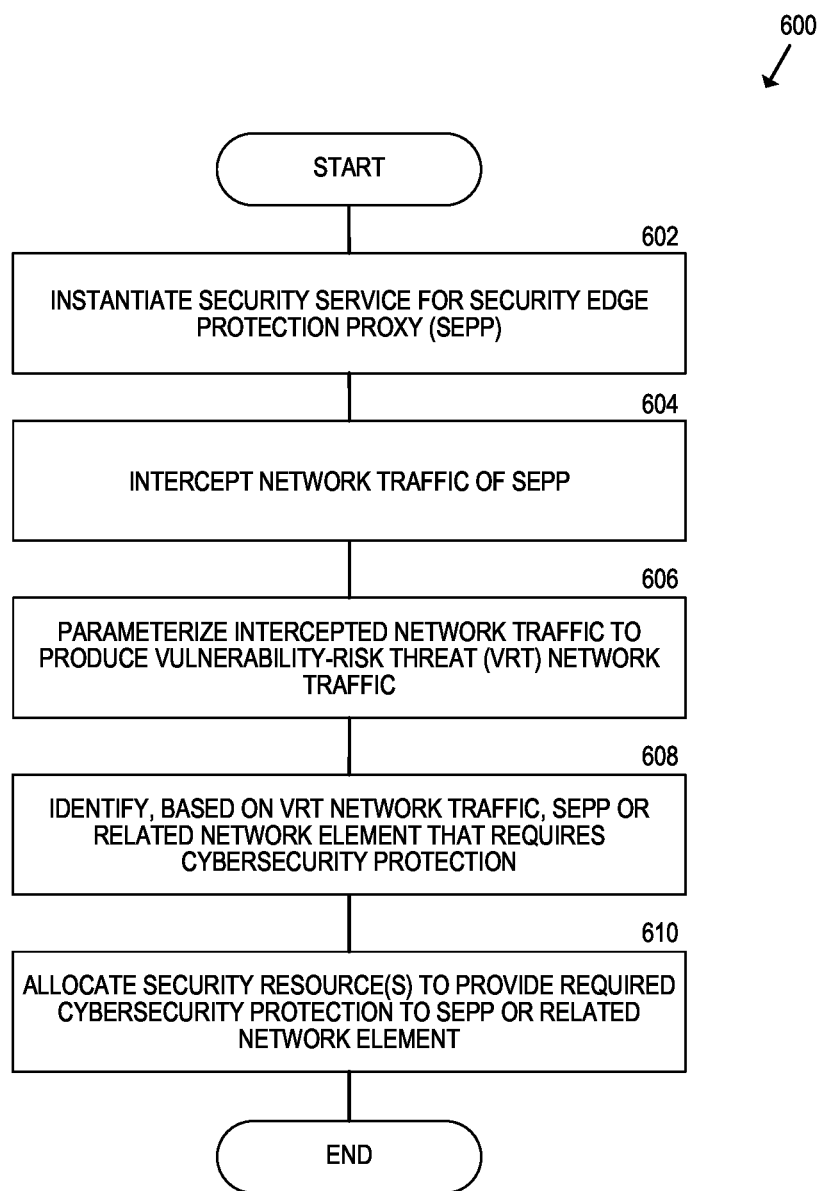
FIG. 6 is a flowchart that illustrates a method performed by the cybersecurity system to provide network edge protection.

FIG. 6 is a flowchart that illustrates a method performed by the cybersecurity system ("system") to provide network edge protection. For example, as described earlier, the system can have components distributed across SEPPs at the edge of the network, where each SEPP orchestrates a VRT function to detect a potential cyberattack.

At 602, the system instantiates a security service for a SEPP. The system can use the service to simultaneously monitor multiple SEPPs at an edge of the network. As such, the service can inspect network traffic of the network at the SEPPs and respond to detected anomalous or malicious network traffic with minimal delay to thwart potential cyberattacks before they penetrate the core network and spread throughout the network.

At 604, the system intercepts network traffic of a SEPP. The network traffic can include HTTP/2 traffic of NFs or other signaling traffic that is exchanged between SEPPs or among components of the SEPP. Examples of NFs include an AUSF, UDM, AMF, PCF, SMF, UPF, NEF, NRF, NSSF, and SCP. In one example, the system intercepts network traffic in real-time or near-real-time. The source of potentially malicious network traffic can include a first NF and a destination of that traffic can include a second NF that is authorized to access a service of the first NF. In one example, the system can perform DPI to analyze headers or payloads of communicated network data packets to determine characteristics indicative of malicious network traffic as described earlier.

At 606, the system parameterizes the network traffic to produce VRT traffic based on a vulnerability parameter that relates to a susceptibility to a cyberattack, a risk parameter that relates to a scope of the cyberattack, and a threat parameter that relates to a source of the cyberattack. For example, the system can parameterize the HTTP/2 traffic to generate VRT traffic.

The system can process the VRT traffic with a VRT model to identify normal, anomalous (e.g., potentially malicious), or known malicious traffic. For example, the system can characterize intercepted HTTP/2 traffic in relation to a vulnerability parameter that relates to a susceptibility of a cyberattack, a risk parameter that relates to a scope of a cyberattack, and a threat parameter that relates to a source of the cyberattack. The system can then identify the HTTP/2 traffic as normal, anomalous, or malicious network traffic based on the parameterized HTTP/2 traffic.

At 608, the system identifies, based on the VRT traffic, a SEPP or related NF or service that require cybersecurity protection. The system can select a security resource capable of mitigating a potential cyberattack and provision the security resource accordingly to provide targeted protection.

At 610, the system allocates the security resources for the SEPP or related NF or service that require cybersecurity protection. The system can also prioritize security resources for those that are MFU and/or MRU. The allocated security resources can mitigate the potential cyberattack at the edge of the network which, as a result, mitigates the risk of cyberattacks that could penetrate the core network and the entire network.

Examples of a security resource include a dedicated monitoring agent that operates to identify malicious network traffic and redirects that traffic to collection, management, and/or sanitization components of the network. The monitoring agent can identify malicious network traffic and execute a proportional local action at a SEPP. For example, the system can also determine a level of a risk (e.g., high, moderate, low) associated with a detected anomaly and, for example, dynamically redirect anomalous traffic that exceeds a threshold risk level to thwart the risk of a cyberattack. In another example, the SEPP can change an operational parameter or change a setting controlled by the SEPP to block, redirect, and/or quarantine the malicious traffic.

In one implementation, SEPPs implement a distributed machine learning (ML) process to improve uniform detection of malicious traffic and to detect coordinated cyberattacks. For example, the SEPPs can each store local models for detecting malicious traffic. The local models can be trained locally based on local VRT traffic or updated based on a global model that is trained with VRT traffic of the distributed SEPPs. Hence, the local models are updated with global data, to offload ML training from the SEPPs to a centralized server. As such, the system can uniformly orchestrate processes to detect coordinated cyberattacks based on VRT traffic of the distributed SEPPs.

Cybersecurity System for Network Slices

Network slicing is a capability of 5G infrastructures that enables multiplexing of virtualized and independent logical networks on the same physical network infrastructure. Network slicing brings a high degree of deployment flexibility and efficient resource utilization when deploying diverse network services and applications. Each network slice is a logical end-to-end (E2E) network tailored to fulfil diverse requirements requested by an application. Each network slice has predetermined capabilities, traffic characteristics, and service level agreements (SLA) and includes virtualized resources required to service the needs of an operator or subscribers.

Network slicing supports 5G mobile networks to efficiently embrace a plethora of services with very different service level requirements (SLR). This service-oriented view leverages the software-defined architecture (SDA) of 5G networks to allow implementation of flexible and scalable network slices on a common network infrastructure. In some implementations, each network slice is administrated by a mobile virtual network operator (MVNO). The infrastructure provider (e.g., the owner of the telecommunication infrastructure) leases its physical resources to the MVNOs that share the underlying physical network. According to the availability of the assigned resources, a MVNO can autonomously deploy multiple network slices that are customized to the various applications provided to its own users.

Network slicing allows a MVNO to create specific virtual networks that cater to particular clients and use cases. Certain applications, such as mobile broadband, machine-to-machine communications (e.g., in manufacturing or logistics), or smart cars, can benefit from leveraging different aspects of 5G technology. One might require higher speeds, another low latency, and yet another access to edge computing resources. By creating separate slices that prioritize specific resources, a 5G operator can offer tailored solutions to particular use cases. Network slicing can enhance service continuity via improved roaming across networks, by creating a virtual network running on physical infrastructure that spans multiple local or national networks or by allowing a host network to create an optimized virtual network which replicates the one offered by a roaming device's home network.

Figure 7:
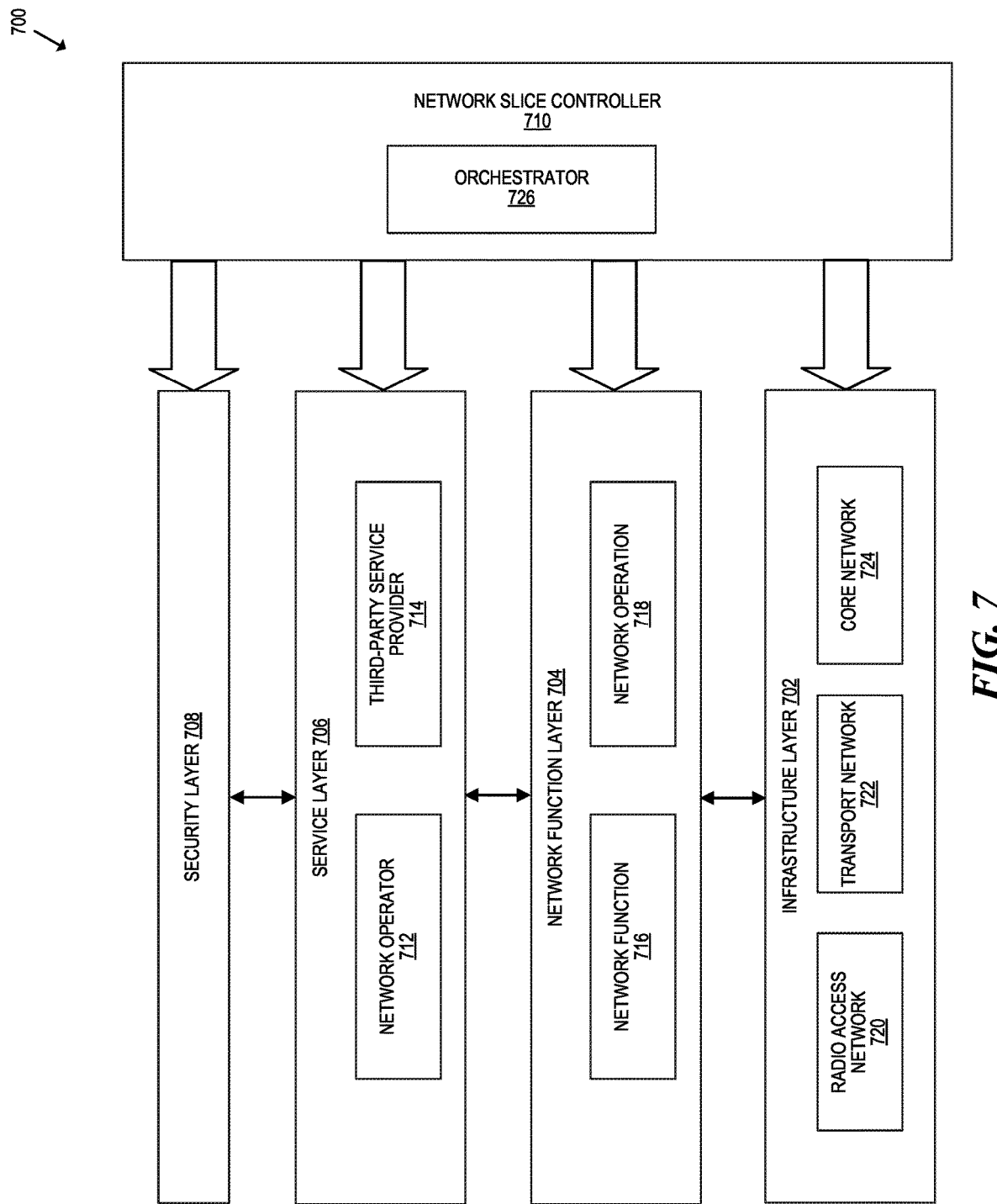
FIG. 7 is a block diagram that illustrates a network slice architecture.

FIG. 7 is a block diagram that illustrates a network slice architecture 700. The architecture 700 includes two main blocks: the first block is dedicated to slice implementation and the other dedicated to slice management and configuration. The first block is designed as a multi-tier architecture including an infrastructure layer 702, a network function layer 704, a service layer 706, and a security layer 708. The layers 702 through 708 contribute to dynamically defining and deploying network slices that satisfy security requirements. The second block includes a network slice controller 710, which is a centralized element that monitors and manages functionalities between the layers 702 through 708 in order to coordinate the coexistence of multiple network slices.

The service layer 706 interfaces directly with network entities including network operators 712 (e.g., MVNOs) and third-party service providers 714 to share an underlying physical network and provide unified service requirements. Each service is represented as an instance, which embeds all the network characteristics in the form of SLA requirements that are expected to be fully satisfied by a suitable slice creation.

The network function layer 704 creates each network slice according to service instance requests of the service layer 702. The network function layer 704 includes a set of network functions 716 that define operations and interfaces. The network functions 716 are placed on a virtual network infrastructure and chained together to create an E2E network slice that includes network characteristics requested by a service. The configuration of the network functions 716 is performed by a set of network operations 718 that allows management throughout creation of a network slice to de-allocation, when a network function provided is no longer needed. To increase resource usage efficiency, the same network function can be simultaneously shared by different network slices at the cost of an increase in the complexity of operation management. Conversely, a one-to-one mapping between each network function and each network slice eases configuration procedures but can lead to inefficient resource usage.

The infrastructure layer 702 represents a physical network topology including the radio access network 720, transport network 722, and core network 724 upon which every network slice is multiplexed, and provides the physical network resources to host the several network functions of each slice. The network domain of the available resources includes a heterogeneous set of infrastructure components like data centers (e.g., storage and computation capacity resources), devices enabling network connectivity such as routers (e.g., networking resources) and base stations (e.g., radio bandwidth resources).

The network slice controller 710 includes a network orchestrator 726, which interfaces with functionalities performed by the layers 702 through 708 to coherently manage each network slice request. Operationally, the network slice controller 710 manages several tasks and provides a more effective coordination between the layers 702 through 708 for E2E service management, to map service instances expressed in terms of SLA requirements with suitable network functions capable of satisfying service constraints.

The network slice controller 710 also manages virtual resource definitions for virtualization of physical network resources in order to simplify resources management operations performed to allocate network functions, and slice lifecycle management for slice performance monitoring across the three layers in order to dynamically reconfigure each slice to accommodate modifications of SLA requirements. The network slice controller 710 can include multiple orchestrator agents that independently manage a subset of functionalities of each layer 702 through 708 to fulfill SLA requirements. The various orchestrator agents coordinate with each other by exchanging information about the state of the operations involved in slice creation and deployment.

The security layer 708 is configured to dynamically allocate, change, and de-allocate security resources. The security resources are assigned to network slices based on a security requirement for an associated function, service, or application. For example, the system can identify functions, services, or applications that require security protection and prioritize cybersecurity resources for those that are MFU or MRU. Further, the security requirement can be determined from network traffic that is converted to VRT traffic as described earlier. Thus, the system can dynamically define security requirements, provision, and allocate or adjust cybersecurity resources per network slice. Once deployed, the cybersecurity resources can dynamically look-up a management system to inspect traffic with high probability of being malicious VRT traffic, deter, and then block high risk traffic from damaging the network elements.

Figure 8:
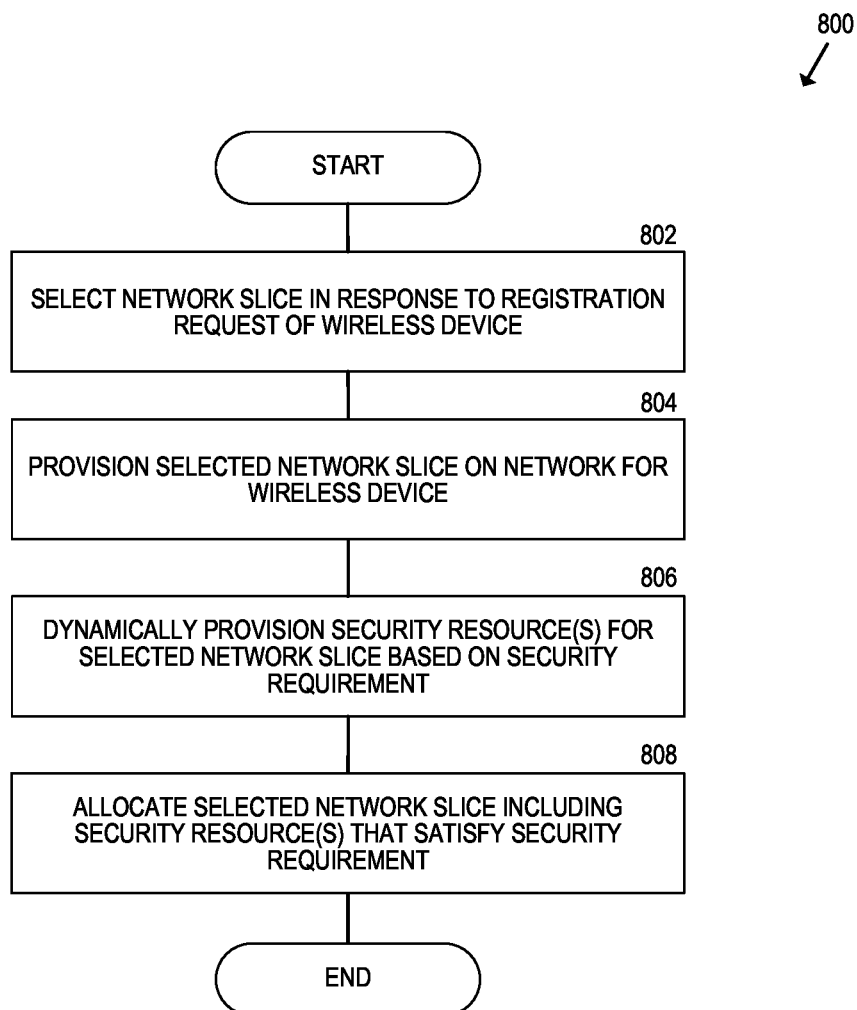
FIG. 8 is a flowchart that illustrates a method performed by a cybersecurity system to secure network slices of a telecommunications network.

FIG. 8 is a flowchart that illustrates a method performed by a cybersecurity system ("system") to secure network slices of a telecommunications network (e.g., 5G network). For example, the system can instantiate an infrastructure layer configured to host network resources for network slices, a network function layer configured to create the network slices according to respective service requirements, a service layer configured to interface with network entities that support the network slices, and a security layer configured to provision security resources in accordance with security requirements of the network slices.

At 802, the system receives a registration request of a wireless device over the network. For example, an AMF of the network receives a registration request of the wireless device. In response, the system selects a network slice from among multiple network slices identified in a memory of the network. For example, a UDM of the network includes a database in a memory that stores indications of network slices. Each network slice is associated with a capability and a traffic characteristic and includes one or more network resources (e.g., a security resource).

At 804, the system provisions a network slice for the wireless device. For example, an NSSF can select the network slice with a capability to support the wireless device and satisfy a service requirement (e.g., including a security requirement). For example, the system can update the UDM of the network to associate an indication of the wireless device with an indication of the selected network slice.

At 806, the system dynamically provisions one or more security resources for the selected network slice based on its security requirement. In one example, the security requirement can be determined by monitoring network traffic associated with functions, applications, or services supported by the selected network slice. Examples of a security requirement include a requirement to secure a function, application, or service of the network slice.

A network slice controller of the system can monitor and manage the security layer, the service layer, the network function layer, and the infrastructure layer to coordinate coexistence of multiple network slices that share security resources. Moreover, the system can monitor network traffic and convert the network traffic into VRT traffic that is processed to identify normal, anomalous, or malicious traffic. Further, the system can prioritize security resources for certain functions, applications, or services of network slices that are MFU and/or MRU.

At 808, the system allocates the selected network slice including security resources that satisfy its security requirement to support the wireless device. The security resources can be dynamically adjusted for multiple network slices in response to newly detected potentially malicious traffic. For example, the system can re-allocate the same network slice including the same security resources for another wireless device or simultaneously provision security resources among two network slices. In yet another example, the system detects a change in (or expiration of) the security requirement of the selected network slice and de-allocates one or more security resources of the network slice while maintaining operation of the network slice.

Suitable Computer System

Figure 9:
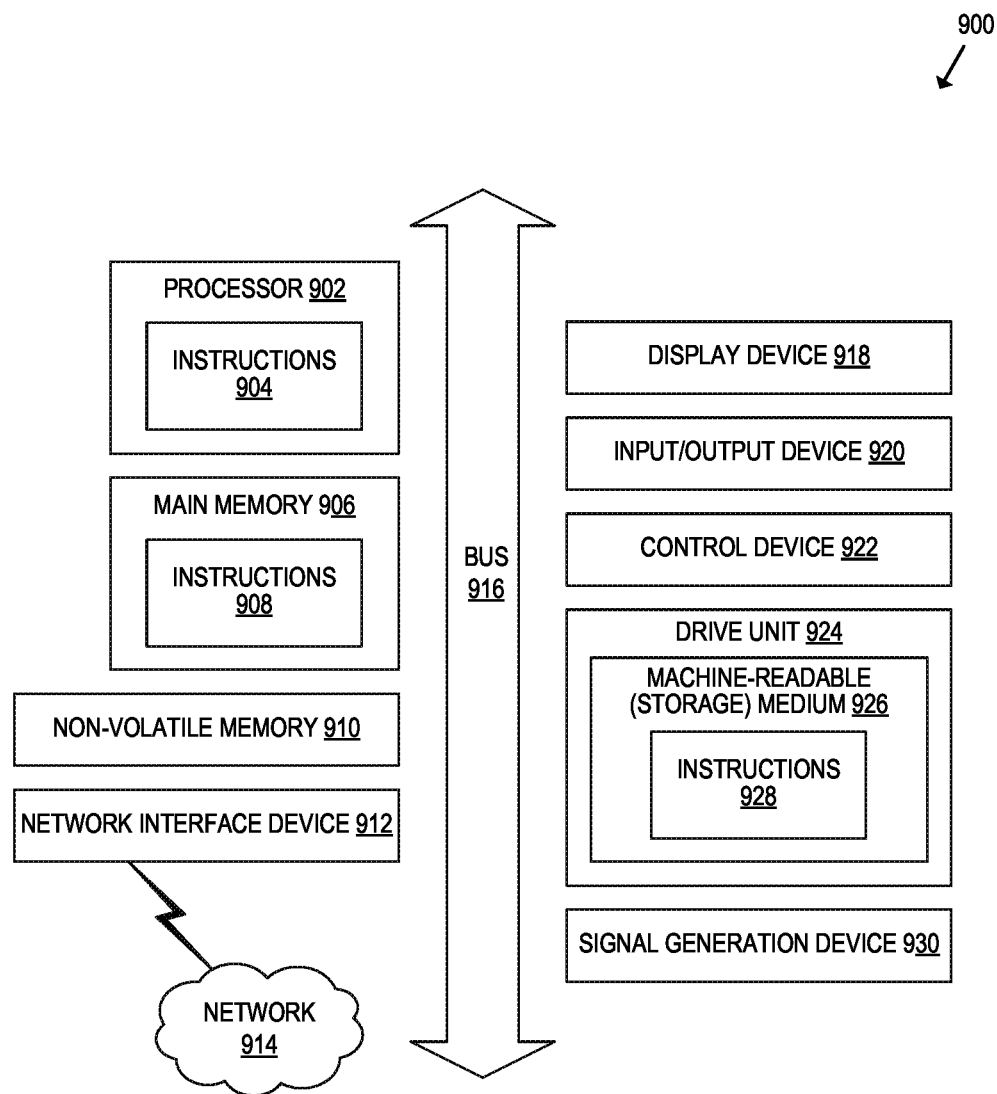
FIG. 9 is a block diagram that illustrates an example of a computing system in which at least some operations described herein can be implemented.

FIG. 9 is a block diagram that illustrates an example of a computer system 900 in which at least some operations described herein can be implemented. For example, components of the system 100 and components discussed with respect to FIGS. 2 through 8 can include or host components of the computing system 900.

As shown, the computer system 900 can include one or more processors 902, main memory 906, non-volatile memory 910, a network interface device 912, video display device 918, an input/output device 920, a control device 922 (e.g., keyboard and point device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. The bus 916 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 9 for brevity. Instead, the computer system 900 is intended to illustrate a hardware device on which components illustrated or described relative to the examples of FIGS. 1-8 and any other components described in this specification can be implemented.

The computer system 900 can take any suitable physical form. For example, the computing system 900 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some embodiment, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The processor 902 can be, for example, a central processing unit, a conventional microprocessor (e.g., Intel Pentium processor). The memory (e.g., main memory 906, non-volatile memory 910, machine-readable medium 926) can be local, remote, or distributed. Although shown as single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. One of skill in the relevant art will recognize that the machine-readable medium 926 can include any type of medium that is accessible by the processor. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

Software is typically stored in the non-volatile memory and/or the drive unit 924. When software is moved to the memory for execution, the processor 902 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 912 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 920 include a keyboard, a mouse or other pointing device, disk drives, printers, a scanner, and other input and/or output devices, including a display device. Examples of the display device 918 can include a cathode ray tube (CRT), liquid crystal display (LCD), or any display device.

In operation, the computer system 900 can be controlled by operating system software that includes a file management system, such as a disk operating system. One example of operating system software with associated item management system software is the family of operating systems known as Windows® from Microsoft Corporation of Redmond, Washington, and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

We claim:

1. At least one non-transitory computer-readable storage medium storing instructions, which, when executed by at least one data processor of a system, cause the system to:
   monitor multiple security edge protection proxy (SEPP) elements at an edge of a fifth-generation (5G) telecommunications network;
   inspect network traffic of the 5G telecommunications network at the multiple SEPP elements,
      wherein the network traffic includes HTTP/2 traffic of multiple Network Functions (NFs);
   categorize, based on the inspected network traffic, the network traffic of the 5G telecommunications network at the multiple SEPP elements, wherein particular network traffic of the 5G telecommunications network at a particular SEPP element of the multiple SEPP elements is categorized as anomalous or malicious network traffic; and
in response to categorizing the particular network traffic as anomalous or malicious network traffic, allocating a security resource to the particular SEPP element,
wherein the security resource redirects the particular network traffic categorized as anomalous or malicious network traffic to a collection, management, or sanitization component of the 5G telecommunications network.

2. The at least one computer-readable storage medium of claim 1, wherein the system is further caused to:
determine a level of risk associated with the particular network traffic categorized as anomalous or malicious network traffic,
wherein the security resource redirects the particular network traffic categorized as anomalous or malicious network traffic to the collection, management, or sanitization component of the 5G telecommunications network based on the determined level of risk.

3. The at least one computer-readable storage medium of claim 1, wherein the system includes components distributed across the multiple SEPP elements at the edge of the 5G telecommunications network, and wherein each respective SEPP element inspects network traffic of the 5G telecommunications network at the respective SEPP element.

4. The at least one computer-readable storage medium of claim 1, wherein the system includes components distributed across the multiple SEPP elements at the edge of the 5G telecommunications network, and the system is caused to:
receive network traffic data from the multiple SEPP elements;
train a global model based on the network traffic data to detect anomalous or malicious network traffic; and
update a local model of the particular SEPP element based on the global model,
wherein the local model of the particular SEPP element is used to categorize the particular network traffic of the 5G telecommunications network at the particular SEPP element.

5. The at least one computer-readable storage medium of claim 4, wherein the global model is trained in accordance with a machine learning process.

6. The at least one computer-readable storage medium of claim 1, wherein the system is caused to:
update a local model of the particular SEPP element based on network traffic data obtained from the multiple SEPP elements; and
categorize the particular network traffic of the 5G telecommunications network at the particular SEPP element based on the local model of the particular SEPP element.

7. The at least one computer-readable medium of claim 1, wherein the system is further caused to:
prioritize the security resource to the particular SEPP element based on the particular SEPP element being a most frequently used (MFU) or most recently used (MRU) SEPP element.

8. The at least one computer-readable medium of claim 1, wherein the security resource is configured to change an operation parameter or setting controlled by the particular SEPP element to redirect the particular network traffic categorized as anomalous or malicious network traffic to the collection, management, or sanitization component of the telecommunications network.

9. At least one non-transitory computer-readable storage medium storing instructions, which, when executed by at least one data processor of a system, cause the system to:
monitor multiple security edge protection proxy (SEPP) elements at an edge of a telecommunications network;
inspect network traffic of the telecommunications network at the multiple SEPP elements;
categorize, based on the inspected network traffic, the network traffic of the telecommunications network at the multiple SEPP elements,
wherein particular network traffic of the telecommunications network at a particular SEPP element of the multiple SEPP elements is categorized as anomalous or malicious network traffic; and
in response to categorizing the particular network traffic as anomalous or malicious network traffic, allocating a security resource to the particular SEPP element,
wherein the security resource redirects the particular network traffic categorized as anomalous or malicious network traffic to a collection, management, or sanitization component of the telecommunications network.

10. The at least one computer-readable storage medium of claim 9, wherein the system is further caused to:
determine a level of risk associated with the particular network traffic categorized as anomalous or malicious network traffic,
wherein the security resource redirects the particular network traffic categorized as anomalous or malicious network traffic to the collection, management, or sanitization component of the telecommunications network based on the determined level of risk.

11. The at least one computer-readable storage medium of claim 9, wherein the system includes components distributed across the multiple SEPP elements at the edge of the telecommunications network, and wherein each respective SEPP element inspects the network traffic of the telecommunications network at the respective SEPP element.

12. The at least one computer-readable storage medium of claim 9, wherein the system includes components distributed across the multiple SEPP elements at the edge of the telecommunications network, and the system is caused to:
receive network traffic data from the multiple SEPP elements;
train a global model based on the network traffic data to detect anomalous or malicious network traffic; and
update a local model of the particular SEPP element based on the global model,
wherein the local model of the particular SEPP element is used to categorize the particular network traffic of the telecommunications network at the particular SEPP element.

13. The at least one computer-readable storage medium of claim 12, wherein the global model is trained in accordance with a machine learning process.

14. The at least one computer-readable storage medium of claim 9, wherein the system is caused to:
update a local model of the particular SEPP element based on network traffic data obtained from the multiple SEPP elements; and
categorize the particular network traffic of the telecommunications network at the particular SEPP element based on the local model of the particular SEPP element.

15. The at least one computer-readable medium of claim 9, wherein the system is further caused to:
  prioritize the security resource to the particular SEPP element based on the particular SEPP element being a most frequently used (MFU) or most recently used (MRU) SEPP element.

16. The at least one computer-readable medium of claim 9, wherein the security resource is configured to change an operation parameter or setting controlled by the particular SEPP element to redirect the particular network traffic categorized as anomalous or malicious network traffic to the collection, management, or sanitization component of the telecommunications network.

17. A system comprising:
  a data processor; and
  a memory including instructions which, when executed by the data processor, cause the system to:
    inspect network traffic of a telecommunications network at multiple SEPP elements at an edge of the telecommunications network;
    determine a model for categorizing network traffic based on the inspected network traffic of the telecommunications network at the multiple SEPP elements;
    categorize particular network traffic of the telecommunications network at a particular SEPP element of the multiple SEPP elements as anomalous or malicious network traffic based on the model; and
    in response to categorizing the particular network traffic as anomalous or malicious network traffic, allocating a security resource to the particular network traffic of the telecommunications network,
      wherein the security resource redirects the particular network traffic categorized as anomalous or malicious network traffic to a collection, management, or sanitization component of the telecommunications network.

18. The system of claim 17, wherein the system includes components distributed across the multiple SEPP elements at the edge of the telecommunications network, and wherein each respective SEPP element inspects the network traffic of the telecommunications network at the respective SEPP element.

19. The system of claim 17, wherein the model is a global model, and the system is caused to:
  update a local model of the particular SEPP element based on the global model,
    wherein the local model of the particular SEPP element is used to categorize network traffic of the telecommunications network at the particular SEPP element.

20. The system of claim 17, wherein the model is a local model at the particular SEPP element, and the system is caused to:
  update the local model of the particular SEPP element based on the inspected network traffic data obtained from the multiple SEPP elements; and
  categorize the particular network traffic of the telecommunications network at the particular SEPP element based on the local model of the particular SEPP element.

* * * * *